W. E. DRESSEL.
AUTOMATIC SELECTIVE GEAR SHIFTING MECHANISM.
APPLICATION FILED AUG. 4, 1917.
1,282,778.
Patented Oct. 29, 1918.
3 SHEETS—SHEET 1.
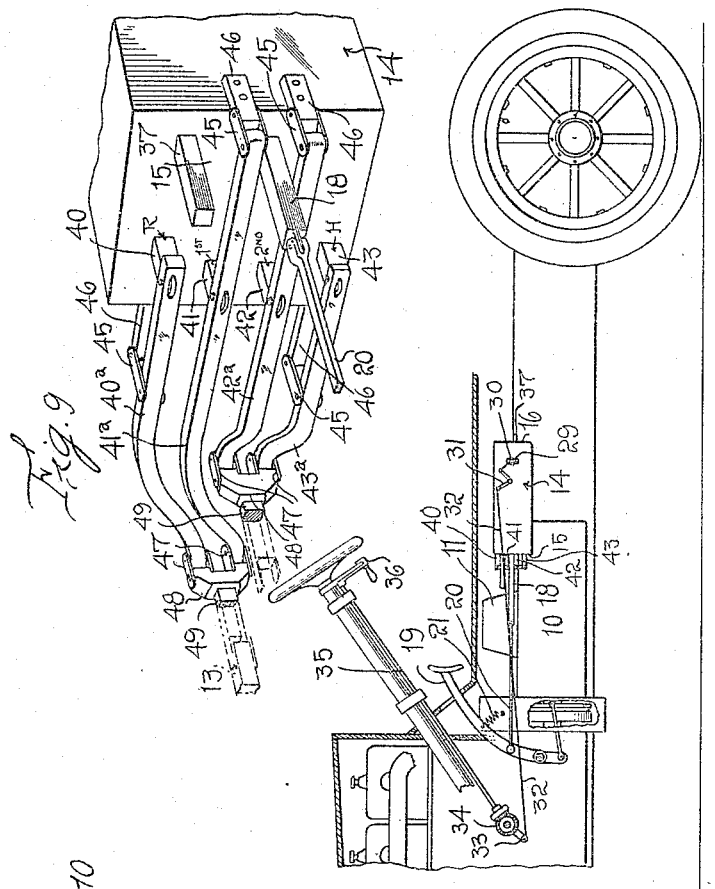
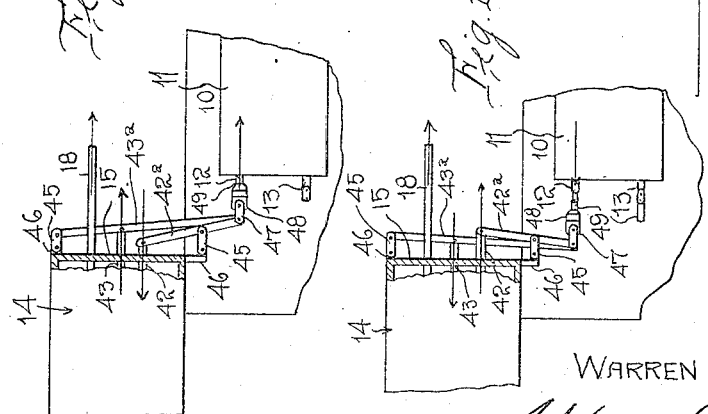
Inventor
WARREN E. DRESSEL
By Watson E. Coleman
Attorney

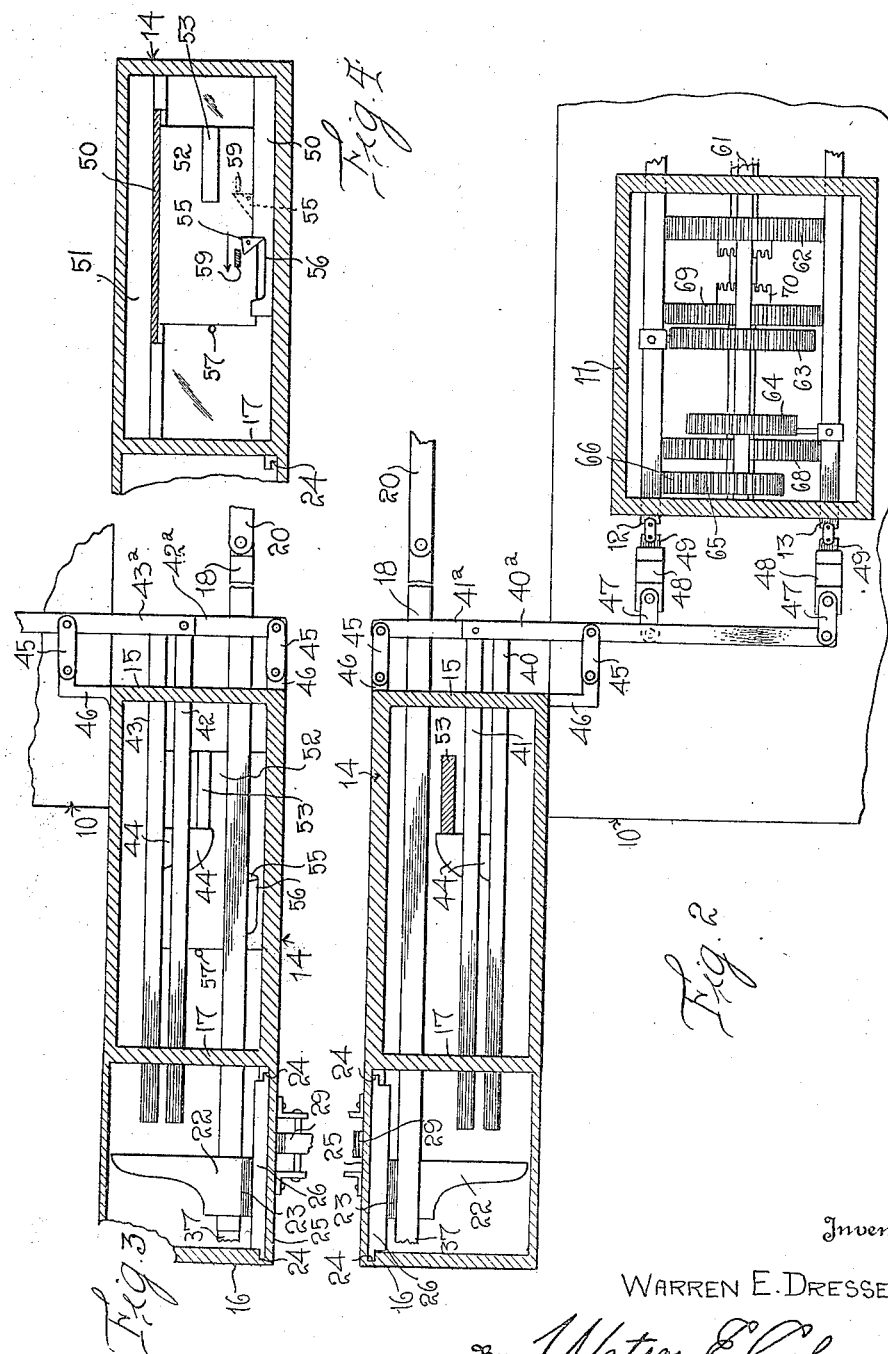

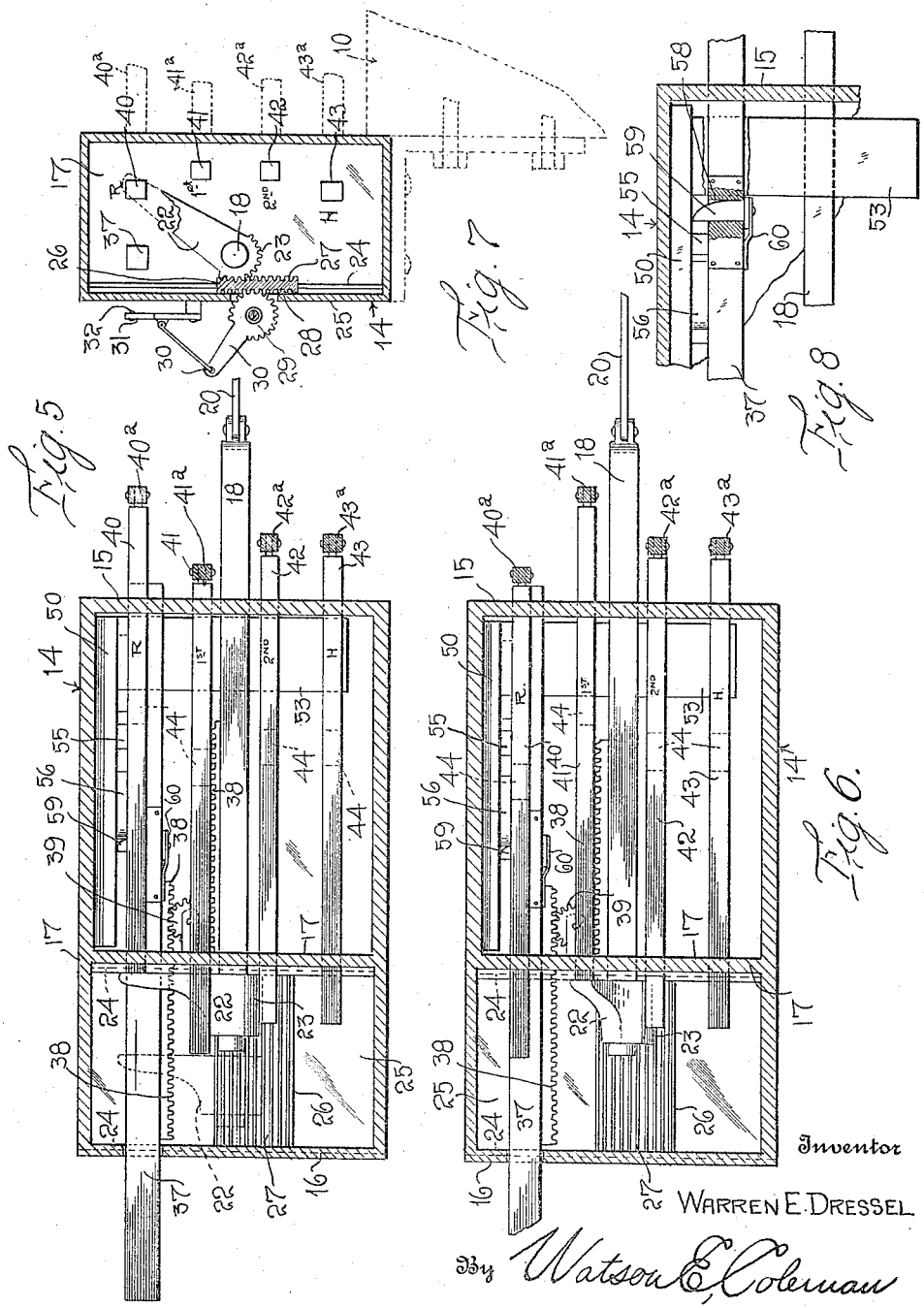

UNITED STATES PATENT OFFICE.

WARREN E. DRESSEL, OF EDWARDSVILLE, ILLINOIS.

AUTOMATIC SELECTIVE GEAR-SHIFTING MECHANISM.

1,282,778. Specification of Letters Patent. Patented Oct. 29, 1918.

Application filed August 4, 1917. Serial No. 184,519.

*To all whom it may concern:*

Be it known that I, WARREN E. DRESSEL, a citizen of the United States, residing at Edwardsville, in the county of Madison and State of Illinois, have invented certain new and useful Improvements in Automatic Selective Gear-Shifting Mechanism, of which the following is a specification, reference being had to the accompanying drawings.

This invention relates to gear shifting mechanism for motor vehicles, and particularly to gear shifting mechanism of the selective type.

The general object of the invention is to provide simple and efficient mechanism for simultaneously shifting a plurality of gears and changing the driving speed or reversing the operation of the driving mechanism, without the necessity of manipulating the gears by means of the hand operated gear shifting lever.

A further object is to provide a construction of this character in which the gears are shifted by shifting the clutch from its clutched to its unclutched position, and in this connection providing gear shifting means which is connected to the gear shifting pedal.

A further object of the invention is to provide a construction of this character which is applicable to practically all makes of cars having sliding gear transmission, and provide a mechanism wherein, assuming that a gear has already been shifted, the throwing in of another gear into operative position will automatically cause the first named gear to return to neutral position, and thus provide means whereby whatever gear is in active position will be automatically returned to its neutral position upon shifting another gear into active position.

Still another object is to provide a selector finger or like member which, when shifted, engages with one of a series of gear shifting rods, and provide very simple means adapted to be connected to the steering post of the automobile for shifting the selector finger to any desired position, and in this connection to provide means for absolutely preventing the gear shifting finger from engaging more than one gear shifting rod at a time.

Other objects will appear in the course of the following description.

My invention is illustrated in the accompanying drawings, wherein:—

Figure 1 is a fragmentary side elevation of a portion of an automobile provided with my improvement;

Fig. 2 is a horizontal section looking from above downward and taken through the gear case and the casing inclosing the gear selecting and operating mechanism;

Fig. 3 is a horizontal section looking upward at the parts of the gear controlling mechanism illustrated in Fig. 2;

Fig. 4 is a fragmentary vertical section on the line 4—4 of Fig. 2;

Fig. 5 is a side elevation of the gear controlling mechanism, the side wall of the casing being removed, Fig. 5 showing the members in a position to shift the reverse gear into operative position;

Fig. 6 is a like view to Fig. 5, but showing the mechanism shifted to throw the low gear into operative position;

Fig. 7 is a section on the line 7—7 of Fig. 5;

Fig. 8 is a fragmentary vertical section through the front upper corner of the casing, the bar 37 being partly broken away to show the latch;

Fig. 9 is a perspective view of the front end of the casing 14 to show the gear shifting levers; and Figs. 10 and 11 are fragmentary top plan views of the gear casing and of the casing housing the controlling mechanism showing two positions of the gear controlling levers.

In Figs. 1 and 2, 10 designates the usual housing or casing inclosing the transmission gearing, and mounted upon the top of this casing 10 is an auxiliary casing 11, through which pass the sliding primary gear shifting rods 12 and 13, which are connected to the gears in the usual or ordinary manner. These gear shifting rods 12 and 13 are ordinarily operated by means of a single lever (not illustrated) which extends upward through an H-shaped slot in the upper wall of the casing 11, the shifting of this lever from right to left engaging the lever with one or the other of the rods 12 or 13 and the shifting of the lever from a neutral position toward one end or the other of the slot shifting the rod 12 or the rod 13 longitudinally in one direction or the other to shift the gears in the usual and well known manner.

I do away with the manually operable lever above referred to, though this lever may be left upon the car, if desired, and operate the rods 12 and 13 to their neutral positions by mechanism contained within the casing 14. This casing 14 may be supported in any suitable manner and is provided with a front wall 15, a rear wall 16 and the intermediate wall 17. Slidably mounted within the casing 14 and extending out through the walls 15 and 17 is the primary operating rod 18, which at its forward end, as illustrated in Fig. 1, is shackled or otherwise suitably connected to the clutch pedal 19, which is the usual clutch pedal of the car. The connection between the rod 18 and the pedal 19 is by means of a pivoted link 20. A spring 21, as usual, acts to return the clutch lever to its clutching position. This clutch lever is, of course, connected to the clutch in the usual and ordinary manner and when the clutch lever is forced forward to release the clutch, the rod 18 is also drawn forward. This rod 18 slides in suitable guide openings formed in the walls 15 and 17 and at its rear end carries upon it the rotatably mounted selector 22, which is in the form of a finger rotatably mounted upon the reduced rear end of the rod 18, and extending radially therefrom. As illustrated in Fig. 7, this selector finger at its butt end is formed with a sector gear 23 and mounted upon suitable guides 24 on the wall 25 is a sliding rack 26 with the teeth on one face of which the sector gear 23 engages, these teeth being designated 27. This rack upon its opposite face is provided with teeth 28 and meshing with these teeth is a sector gear 29, which is rotatably mounted upon the wall 25 in any suitable manner and is provided with a radially directed arm 30. This arm is connected to certain operating mechanism on the steering post in any suitable manner.

I have illustrated for this purpose a bell crank lever 31 having a linked connection to the end of the arm 30, this bell crank lever being connected by means of a rod 32 to an arm 33 having a beveled gear 34 engaging with the beveled gear carried upon the end of a shaft 35 which extends parallel to the steering post and is provided at its extremity with an operating arm 36 mounted to rotate over an arcuate sector having indicia thereon to indicate the position of the selector at any desired time.

Also slidingly mounted in the walls 15 and 17 and disposed in parallel relation to the rods 18 is a rod 37. The confronting faces of the rod 18 and of the rod 37 are provided with rack teeth 38 and disposed between the rods 37 and 18 and mounted in brackets on the walls 17 is a gear wheel 39 meshing with these rack teeth. It will be obvious from Fig. 5, therefore, that when the rod 18 is pulled forward, the rod 37 will be shifted rearward and when the rod 37 moves forward, the rod 18 will move rearward. This rod 37 may be termed the neutralizing rod to distinguish it from the rod 18, which I will hereafter term the actuating rod.

Also mounted to slide in the walls 15 and 17 are a plurality of gear shifting rods 40, 41, 42 and 43. Of these rods, the rod 40 actuates the reverse, the rod 41 shifts into low speed, the rod 42 into second speed and the rod 43 into high speed or direct drive. Each of these rods, intermediate of its length, carries an inwardly extending lug 44 and each of these rods at its forward end is pivotally connected to a corresponding lever $40^a$, $41^a$, $42^a$ and $43^a$. The lever $40^a$ is pivotally connected by means of shackles 45 to a bracket 46 mounted upon the end wall of the casing, the fulcrum of the lever $40^a$ being thus disposed between the extremity of the lever and its point of connection to the corresponding piston rod 40. The lever $41^a$ is pivotally connected at its rear end by means of shackles 45 to a bracket 46, the point of connection to the rod 41 being between its fulcrum and the free end of the lever. The lever $42^a$ is mounted in the same manner as the lever $41^a$, that is, its connection to the corresponding shifter rod 42 is between the fulcrum and the free end of the lever and the lever $43^a$ is mounted in the same manner as the lever $40^a$, that is, its fulcrum is between its point of connection to the rod 43 and its free end. The levers $40^a$ and $41^a$ at their free ends are connected by shackles 47 to a yoke 48 from which extends an arm 49, which is shackled or otherwise operatively connected to the gear shifting rod 12 and the levers $42^a$ and $43^a$ are operatively connected by a like yoke 48 having an arm 49 operatively connected to the rod 13, as shown in Fig. 9.

Disposed in guides 50 mounted upon the top wall 51 of the casing is a slide 52 in the form of a plate, this slide carrying an outwardly projecting transversely extending bar 53, this bar moving with the slide and extending across the paths of movement of the several lugs 44. Carried by the slide 52 is a pawl 55 and the guide 50 adjacent to the lower edge of the slide 52 is provided with an elongated recess 56. The pawl 55 is pivoted and is adapted to drop into this recess in the manner illustrated in Fig. 4, when the slide has moved away from the front wall of the casing to a position about midway of the casing and against the stop 57. The neutralizing rod 37 is transversely slotted as at 58 (see Fig. 8) and mounted in this slot is a latch 59, which is forced inward by means of a spring 60, which latch is adapted to engage the pawl 55 in the manner illustrated in dotted lines in Fig. 4, when the slide 52 is shifted against the forward wall of the casing. Now when the rod 18 is shifted forward by a movement of the clutch pedal to a position to release the clutch, the neutralizing bar or rod 37 will move rearward because of the gear wheel 39 and as it moves rearward, the latch 59 will engage the pawl 55 and shift the slide 52 rearward, this rearward movement of the slide carrying with it the transverse bar 53 and this bar engaging with any of the lugs 44 that may have been shifted to a position forward of neutral. As soon as the slide 52 reaches its neutral position, that is, the position shown in Figs. 3 and 4, the pawl 55 drops down into the recess 56 and out of the way of the latch and, as a consequence, the neutralizing bar can go still farther rearward, without however shifting the slide 52 and the bar 53 any farther rearward.

The operation of this mechanism is as follows: Assuming that all of the rods 40, 41, 42 and 43 are in neutral position, that the levers 40ª, 41ª, 42ª and 43ª are in neutral position, and that the transmission gears are therefore in neutral position, then if it be desired to throw in the reverse, the selector finger 22 is shifted by operating the rack 27 until the selector finger is disposed with its end immediately behind the rod 40, as in Fig. 7.

The clutch pedal 19 is then forced forward, thus first releasing the clutch, and then on a further forward movement of the pedal, the rod 18 will be shifted so far that the finger 22 will engage the rear end of the rod 40 and shift this rod forward. As the rod 18 moves forward, the rod 37 will move rearward, carrying with it the slide 52 and the cross bar 53, but before the lug 44 on the rod 40 has engaged this cross bar 53, the pawl 55 will drop into the slot 56 and out of the path of movement of the latch 59. As a consequence the rod 37 can continue its rearward movement and the rod 18 its forward movement and the lug 44 of the rod 40 engages the cross bar 53 and shifts it toward the front of the casing. The rod 40, of course, in its forward movement shifts the lever 40ª and carries the outer end of this lever rearward, thus shifting the gear shifting rod 12 rearward to carry the gears into "reverse." Inasmuch as the lever 40ª is coupled to the lever 41ª both of these levers will move together, but as the fulcrum points of these levers are reversed, it will be obvious that the effect of moving the rod 40 forward will be to shift the rod 41 rearward, so that this rod 41 is entirely inoperative.

It will be understood that as soon as pressure on the clutch pedal is released, the spring will draw the clutch pedal rearward again shifting the clutch into active position and shifting the rod 18 rearward and the rod 37 forward until the latch 59 slips past the pawl 55.

Now assuming that it be desired to go from reverse into slow speed forward, then the selector finger is shifted by the mechanism hereafter described to a position where its extremity is opposite the shifting rod 41. Now when the clutch pedal is forced forward to release the clutch, the rod 18 will again be drawn forward and as it moves forward the rod 37 will shift rearward carrying with it the slide 52 and the cross bar 53. As the cross bar 53 moves rearward, it will engage with the lug 44 on the rod 40 and shift this rod 40 rearward to neutral position, thus of course shifting the lever 40ª to neutral position and the reverse gear to neutral position. The pawl 55 becomes disengaged from the latch 59 when the pawl reaches the recess 56 and thus the rod 57 continues its rearward motion and the rod 18 continues its forward movement and the selector finger eventually strikes the shifter rod 41 and shifts it forward to its full extent, thus shifting the lever 41ª forward, and therefore shifting the rod 12 forward so as to shift the transmission gears into "low." Of course because of the reverse pivoting of the levers 40ª and 41ª, the rod 41 will be shifted rearward but this rearward movement is merely a lost motion and the rod 41 is inoperative on moving rearward.

Exactly the same action occurs if it be desired to shift from low into high speed. The selector finger is turned opposite the rod 43 and upon shifting the clutch pedal to release the clutch, the finger will shift the rod 43 forward shifting the lever 43ª and putting the transmission gears in high, the neutralizing mechanism comprising the slide 52, the bar 53 and the rod 37 acting to return the rod 41 to its neutral position and returning the gears correlated with this rod to a neutral position before the gears are shifted into high.

It will be seen that it is possible to go from high to low or from low immediately to high, or from reverse to low, high or second speed, without having to progress through the several speeds and, under all circumstances, the gear that is in operation is shifted to a neutral position before it is possible for the selected gear to be thrown in. It will further be noted that the clutch is thrown out before the gears are shifted and that the operation involves first the throwing out of the clutch, then the shifting of the active gear to neutral position, and then the shifting of the selected gear to its operative position, and next the throwing in of the clutch.

It will be obvious that the mechanism controlling the shifting of the transmission gears is exceedingly simple and positive in its action, and that it eliminates entirely the necessity of care in throwing out the clutch prior to shifting the gears and the necessity of using a separate mechanism for throwing the clutch and actuating the gear shifting mechanism. The same action which is used to throw out the clutch will shift the gears upon a continued forward movement of the clutch pedal. To merely throw out the clutch without shifting the gears involves simply that the clutch pedal shall not be forced forward more than a predetermined amount, but if it is desired to shift the gears then the clutch pedal is forced forward to its full extent, and it is further obvious that when the selector finger is in its neutral position, the full forward movement of the clutch pedal, and the full forward movement of the bar 18 will not in any way effect the shifting of the gears. The selector finger cannot strike two shifter rods at the same time, because there is enough space between the rods 40 and 41, and 41 and 42 to receive the selector finger between these rods and when the selector finger is engaged with one of the rods, even to a small extent, it cannot overlap or engage with any one of the adjacent rods.

It will further be noted that this mechanism can be applied to cars already constructed and to practically any form of sliding, change speed gears. The selector finger, its rack and other parts are preferably inclosed so that no dust will accumulate around these parts to impede the proper operation and so that the parts may be thoroughly lubricated.

While I do not wish to be limited to any particular form of transmission gearing, I have illustrated in Fig. 2, a common form of transmission gearing and in this figure, 61 designates the power shaft which has a clutch connection to the crank shaft of the engine, this power shaft carrying the direct driving gear wheels 62, and also carrying the intermediate gear wheel 63, the low gear wheel 64 and the reverse gears 65 and 66. Mounted upon a counter-shaft 67 to slide therealong are the gears 68 and 69, which are shiftable by means of the rods 12 and 13 respectively. As illustrated in Fig. 2, the gears are in neutral, but it will be understood that by shifting the rods 12 or 13, the various gears may be shifted into a plurality of relations whereby to secure a low driving speed, a second speed, a direct connection between the gears 62 and 69 through the medium of the clutches 70, and a reverse, through the medium of the reversing gears 65 and 66. The form of gears, as shown, is purely illustrative and I do not wish to be limited to this arrangement of gearing. Inasmuch as this arrangement of gearing is common and well known, it is not believed that any further description of it is necessary.

While I have illustrated a form of my invention which has been found thoroughly effective in actual use, yet it is obvious that many modifications might be made in the details of construction and arrangement of parts, without departing from the spirit of the invention.

Having thus described my invention, what I claim is:—

1. In a gear shifting mechanism, a clutch pedal, a plurality of gear shifting members shiftable from a neutral position to an active position, a longitudinally shiftable actuating rod disposed at the intersection of a plurality of radial planes operatively connected to the pedal, manually rotatable means rotatably mounted upon said rod and shiftable into any one of said radial planes for selectively engaging the actuating rod with any one of said gear shifting members, whereby to cause a movement of the selected gear shifting member into active position upon a movement of the actuating rod under the action of the clutch pedal when the latter is thrown to release the clutch, and means actuated by an initial movement of a further actuating rod shifting any previously active gear into neutral position before a previously inactive gear is shifted into active position.

2. The combination with a sliding gear transmission having shiftable gears for establishing a plurality of driving relations, a power shaft, a driven shaft, and a clutch therefor, of means for shifting any one of said gears into or out of active relation comprising a gear shifting member for each gear, an actuating member having manually operable means whereby it may be engaged with any gear shifting member, a neutralizing member normally disposed in a position to engage any gear shifting member which is in active position, and means operatively connecting the actuating member and the neutralizing member for causing a simultaneous movement of the neutralizing member and actuating member in opposite directions upon an actuation of the actuating member to shift a gear to active position, to thereby carry the previously shifted gear to a neutral position.

3. The combination with a sliding gear transmission having shiftable gears for establishing a plurality of driving relations, a power shaft, a driven shaft, and a clutch therefor, of means for shifting any one of said gears into or out of active relation comprising a gear shifting member for each gear, an actuating member having manually operable means whereby it may be engaged with any gear shifting member and having rack teeth, a neutralizing member including an element disposed in a position to engage any gear shifting member which is in active position, said neutralizing member having gear teeth facing the gear teeth on the actuating member, and a gear wheel fixedly mounted and disposed between the neutralizing member and the actuating member and engaging said gear teeth whereby to cause a movement of the neutralizing member in an opposite direction to the movement of the actuating member to return the previously active gear to its neutral position, upon the initial actuation of the actuating member to shift a gear to an active position.

4. The combination with a sliding gear transmission having shiftable gears for establishing a plurality of driving relations, a power shaft, a driven shaft and a clutch therefor, of means for shifting any one of said gears into or out of active relations comprising a gear shifting member for each gear, a longitudinally slidable actuating member having manually operable means whereby it may be engaged with any gear shifting member, and means for neutralizing a previously active gear comprising a neutralizing member extending parallel to the actuating member, both of said members having gear teeth, a fixedly mounted gear wheel disposed between said members and engaging the gear teeth whereby said members shall have simultaneous movement in opposite directions, a neutralizing slide normally disposed in a position to engage any gear shifting member which is in active position, and means engaging said slide with the neutralizing member for the movement of the slide and the neutralizing member together toward the neutralizing position, said slide being then disengaged from the neutralizing member whereby the slide may be shifted to its normal position upon the movement of the selected gear shifting member to an active position.

5. The combination with a sliding gear transmission having shifting gears for establishing a plurality of driving relations, a power shaft, a driven shaft, a clutch between the power shaft and driven shaft, and a clutch pedal, of a longitudinally shiftable actuating member operatively connected to the clutch pedal to shift therewith, a plurality of longitudinally shiftable gear shifting members mounted in planes radial to the actuating member, a selector mounted upon the actuating member and manually shiftable into position to engage any one of said gear shifting members, and means for returning any active gear shifting member to a neutral position, to thereby return its connected gear to neutral position, including a longitudinally movable neutralizing member extending parallel to the actuating member, means for causing a reverse movement of the said neutralizing member upon a forward movement of the actuating member, and means carried by said neutralizing member for engaging any previously shifted gear shifting member and returning it to its neutral position prior to the engagement of the selector with the selected gear shifting member.

6. The combination with a sliding gear transmission having shiftable gears for establishing a plurality of driving relations, a power shaft, a driven shaft, a clutch between the power shaft and driven shaft, and a clutch pedal, of means for shifting the several gears including longitudinally movable rods, each operatively connected with one of said gears, a longitudinally movable actuating rod operatively connected to the clutch pedal to move therewith, a selector finger rotatably mounted upon the rear end of said actuating rod, and manually operable means for shifting said selector finger into a position opposite any one of said gear shifting rods and including a sector gear carried by the selector finger and a manually operable rack engaging with the sector gear, said rack having a width equal to the longitudinal throw of the actuating rod.

7. The combination with a sliding gear transmission having shiftable gears for establishing a plurality of driving relations, a power shaft, a driven shaft, a clutch between the power shaft and driven shaft, and a clutch pedal, of means for shifting the several gears including longitudinally movable rods, each operatively connected with one of said gears, a longitudinally movable actuating rod operatively connected to the clutch pedal to move therewith, a selector finger rotatably mounted upon the rear end of said actuating rod, manually operable means for shifting said selector finger into a position opposite any one of said gear shifting rods, a slide having a transversely extending bar, lugs projecting from the gear shifting rods and disposed in the path of movement of said bar, and means acting upon an initial forward movement of the actuating member acting to reversely shift said slide and its connected bar to thereby cause the return of any previously shifted gear shifting member to its neutral position before the selector finger engages with the selected gear shifting member.

8. In combination with a sliding gear transmission having shifting gears for establishing a plurality of driving relations, a power shaft, a driven shaft, a clutch between the power shaft and driven shaft, and a clutch pedal for actuating said clutch, of a plurality of longitudinally slidable gear shifting members, each operatively connected to said gears, an actuating rod operatively connected to the clutch pedal and movable therewith when the pedal is shifted to release the clutch, a selector finger pivotally mounted upon the actuating rod and rotatably shiftable into a position opposite any one of said gear shifting members, and means for shifting said finger comprising a sliding rack intermeshing with the butt end of the finger, and manually operable means connected to said rack for shifting it and including a member movable over a dial.

9. In combination with a sliding gear transmission having shifting gears for establishing a plurality of driving relations, a power shaft, a driven shaft, a clutch between the power shaft and driven shaft, and a clutch pedal for actuating said clutch, of a plurality of longitudinally slidable gear shifting rods, each operatively connected to said gears, an actuating rod operatively connected to the clutch pedal and movable therewith when the pedal is shifted to release the clutch, a selector finger pivotally mounted upon the rear end of the actuating rod and rotatably shiftable into a position opposite any one of said gear shifting rods, means for shifting said finger comprising a sliding rack intermeshing with the butt end of the finger, manually operable means connected to said rack for shifting it, including a sector gear meshing with the rack and having an arm, a manually shiftable member moving over a dial, and operative connections between said member and the arm on the sector gear.

10. In combination with a sliding gear transmission having shifting gears for establishing a plurality of driving relations, a power shaft, a driven shaft, a clutch between the power shaft and the driven shaft, and a clutch pedal, of means for selectively shifting the gears comprising a plurality of longitudinally shiftable gear shifting members arranged in pairs and each having a projecting lug, the lugs projecting in the same direction, a plurality of levers, one for each of said gear shifting rods, one of the levers for each pair of rods being pivoted intermediate its ends and the other of said levers for the same pair being pivoted at its end, the opposite ends of the levers being both connected to a main gear shifting rod, a longitudinally shiftable actuating rod operatively connected to the clutch pedal and shiftable thereby, a manually shiftable selector mounted upon the actuating rod and shiftable into a position to engage any one of said gear shifting rods, and means for returning any gear previously shifted to an active position to a neutral position, comprising a neutralizing rod disposed parallel to the actuating rod and having a laterally projecting resiliently urged latch, a gear wheel disposed between the actuating rod and the neutralizing rod and engaged with both of said rods to cause the neutralizing rod to be shifted in a direction reverse to the direction of movement of the acuating rod, a slide having a transversely extending bar, and a pawl carried upon the slide and engageable with said latch to cause a common movement of the slide and the neutralizing bar when the neutralizing bar moves rearward, the pawl and latch disengaging upon a forward movement of the neutralizing bar, said bar carried by the slide being disposed in the path of movement of said lugs on the gear shifting rods.

11. In combination with a sliding gear transmission having shifting gears for establishing a plurality of driving relations, a power shaft, a driven shaft, a clutch between the power shaft and driven shaft, and a clutch pedal, of means for selectively shifting the gears comprising a plurality of longitudinally shiftable gear shifting members arranged in pairs, each having a projecting lug, the lugs projecting in the same direction, a plurality of levers, one for each of said gear shifting rods, one of the levers for each pair of rods being pivoted intermediate its ends and the other of said levers for the same pair being pivoted at its end, the opposite ends of the levers being both connected to a main gear shifting rod, a longitudinally shiftable actuating rod operatively connected to the clutch pedal to be shifted thereby, a manually shiftable selector mounted upon the actuating rod and shiftable thereon into a position to engage in one of said gear shifting rods, and means operated by said actuating rod for returning any gear previously shifted to an active position to a neutral position upon an initial movement of the actuating rod.

12. In combination with a sliding gear transmission having shifting gears for establishing a plurality of driving relations, a power shaft, a driven shaft, a clutch between the power shaft and the driven shaft, and a clutch pedal, of means for selectively shifting the gears comprising a plurality of longitudinally shiftable gear shifting members, means operatively connecting said gear shifting members to the gears to be shifted, a longitudinally shiftable actuating rod, a selector mounted upon the actuating rod and manually shiftable into a position to engage any one of said gear shifting members, and means for returning any gear, previously shifted to an active position, to a neutral position comprising a neutralizing rod disposed parallel to the actuating rod and having a laterally projecting resiliently urged latch, a gear wheel disposed between the actuating rod and the neutralizing rod and engaging both of said rods to cause the neutralizing rod to move in an opposite direction to that of the actuating rod, a slide having a transversely extending bar disposed in the path of movement of said gear shifting members, and a pawl carried upon the slide and engageable with said latch to cause a common movement of the slide and the neutralizing bar when the neutralizing bar moves rearward, the pawl and latch disengaging upon a forward movement of the neutralizing bar.

13. The combination with a sliding gear transmission including shiftable gears for establishing a plurality of driving relations, and a pair of sliding gear engaging rods shiftable from a neutral position in either direction, of clutch pedal operated means for shifting said rods, manually selective means for operatively engaging the actuating means with either of said rods and to cause the shifting of the rod so selected in either selected direction, and means for returning either of the rods to a neutral position before the other rod is again shifted by the clutch pedal to shift the gears into new active positions.

In testimony whereof I hereunto affix my signature in the presence of two witnesses.

WARREN E. DRESSEL.

Witnesses:
  FREDERIC B. WRIGHT,
  M. R. WILSON.